United States Patent Office 3,565,972
Patented Feb. 23, 1971

3,565,972
STRUCTURAL ADHESIVES FROM URETHANE PREPOLYMERS, POLYEPOXIDES, LATENT SOLID DIAMINES, AND LEWIS ACID AMINE COMPLEXES
James P. Harris, Troy, Mich., assignor to General Motors Corporation, Detroit, Mich., a corporation of Delaware
No Drawing. Filed Feb. 26, 1968, Ser. No. 707,994
Int. Cl. C08g 45/12
U.S. Cl. 260—830                              1 Claim

ABSTRACT OF THE DISCLOSURE

A rapid curing, high strength structural adhesive formulation is disclosed which may be employed in either a one-part or multi-part composition. In a preferred form, a one-part formulation is employed which contains a polyurethane prepolymer formed by the reaction between toluene diisocyanate and a polyalkylene ether glycol, a low molecular weight liquid epoxy resin derived from bisphenol-A and epichlorohydrin, a latent solid primary diamine and a small but effective amount of a Lewis acid-amine complex. This composition has a prolonged shelf life at normal room temperature, but may be cured at a rapid rate by heating at temperatures of about 250° F. or higher.

This invention relates to high strength structural adhesive having prolonged room temperature shelf lives, but which may be rapidly cured upon being heated. More particularly, it relates to a class of rapid curing structural adhesives which contain specific polyurethane prepolymers and epoxy resins, a solid diamine curing agent and a synergistic catalyst which promotes an extremely rapid cure at a suitable elevated temperature.

In a copending U.S. patent application, S.N. 471,262, filed July 12, 1965, now abandoned, novel high strength polyurethane-epoxy resin-solid diamine adhesive formulations were disclosed. Adhesive formulations in accordance with the disclosure have been used to bond together many different materials. While the strength of the bond might vary depending upon the materials being joined, the adhesive had utility in a wide variety of structural applications. For example, when certain of the preferred, particularly rapid curing adhesive mixtures were applied to the end portion of a surface of steel strips and the coated strips were suitably placed together in pairs and heated at about 250° F. for five minutes, the formulation cured to produce a strong bond. Lap shear strength values of 3,000–5,000 p.s.i. were measured in accordance with ASTM D–1002 Test Method-Strength Properties of Adhesives-Shear by Tension Loading. When the diamine curing agent is prepared in a latent form, these rapid curing formulations are observed to have, under preferred conditions, a shelf life of about two months. However, it would be highly desirable for many applications to obtain an adhesive formulation having a shelf life at normal room temperature of five months or more while still being curable to maximum bonding strength within a few minutes at a suitable elevated temperature.

Accordingly, it is an object of the present invention to provide an adhesive formulation which is relatively stable at room temperature and which is rapidly curable at a suitable elevated temperature, containing a mixture of polyurethane resins and epoxy resins, a solid diamine curing agent and a synergistic catalyst which promotes the rapid cure.

It is a more specific object of the present invention to provide a polyurethane prepolymer-epoxy resin-primary diamine adhesive formulation wherein a small but effective amount of a Lewis acid-amine complex is incorporated for the purpose of markedly increasing the cure rate of the basic formulation without significantly altering other properties.

It is another object of the present invention to provide a one-part polyurethane prepolymer-epoxy resin-latent solid primary diamine curing agent adhesive formulation wherein a relatively small amount of a Lewis acid-amine catalyst is incorporated, the overall formulation being characterized by a long shelf life and an extremely rapid cure when heated to temperatures of 250° F. or higher.

In accordance with the invention these and other objects are accomplished in a preferred embodiment thereof by providing a one- or multi-part adhesive formulation of overall composition comprising by weight about 100 parts of a liquid polyurethane prepolymer, formed by the reaction between toluene diisocyanate and a polyalkylene ether glycol, the prepolymer being characterized by an isocyanate content of from about 4–10%; 10–40 parts of a low molecular weight liquid epoxy resin reaction product of bisphenol-A (or homologs thereof) and epichlorohydrin; 8–50 parts of a solid primary diamine; and a small amount, up to about 3% by weight (about 6 parts) of the balance of the adhesive formulation, of a Lewis acid-amine complex such as for example the aluminum trichloride-aniline complex. While relatively small amounts of the Lewis acid-amine complex, up to 3% by weight, are preferred, greater amounts up to 10% by weight may suitably be employed in my adhesive formulation. This adhesive formulation may be employed as a multi-part composition wherein the diamine curing agent or the diamine curing agent and the catalyst are maintained separately from the epoxy and urethane resins until a few minutes or hours before the adhesive is to be used. The separate parts are then uniformly mixed together and applied as a thin coating to a surface of the members to be joined. The members are assembled with the adhesive coated surfaces in juxtaposition, the assembly is rapidly heated to a temperature of preferably about 250°–300° F. for a brief time, usually about five minutes depending upon the curing temperature. The strength of the adhesive bond will vary somewhat depending on the materials which are being joined. However, in general, the structural properties of the adhesive are considered to be excellent. For example, lap shear strength values of steel specimens bonded together employing the subject adhesive have been observed to be as great as about 5,000 p.s.i.

The subject invention also comprehends the employment of a solid latent diamine catalyst in finely divided powder form which is generally inert with respect to urethane and epoxy resins at room temperature but capable of curing these materials at elevated temperatures such as 150°–350° F. With the availability of such a curing agent a one-part adhesive formulation in accordance with the subject invention can be prepared which will have an extended shelf life at room temperature of about five months or more. One suitable method of preparing a solid latent diamine curing agent is set forth in U.S. Pat. No. 3,375,299, patented Mar. 26, 1968. In accordance with that disclosure, finely divided solid diamine curing agent particles are treated with a suitable organic acid chloride to convert the active amine groups at or near the surface of the particle to nonreactive amide groups, the unreacted amine groups below the surface of the particle thereby being blocked off until the particle is heated to a suitable elevated temperature. When a latent amine particle is employed, the urethane prepolymer, the liquid epoxy resin, the latent diamine curing agent and the Lewis acid-amine catalyst may all be incorporated into a one-part adhesive formulation. This one-part formulation is observed to have a shelf life of five months or more at room temperature but can be cured to form a strong adhesive bond by heating to a temperature of about 250° F. for about one minute.

The resins which are employed in the subject structural adhesive formulation are a mixture of a specific class of polyurethane prepolymers with a specific class of low molecular weight liquid diglycidyl ether epoxy compounds. The urethane prepolymers which are used in this invention are commercially available reaction products of toluene diisocyanate and a liquid polyalkylene ether glycol in such a ratio as to obtain an excess of isocyanate groups. As is known, polyalkylene ether glycols are substantially linear polymers formed by the reaction between alkylene oxides and alkylene glycols to form an ether linkage between the aliphatic portions. These compounds are terminated at each end by hydroxyl groups. Examples of suitable alkylene oxides are ethylene oxide and propylene oxide, and examples of alkylene glycols are ethylene glycol, propylene glycol, and butylene glycol. Prepolymers of varying molecular weights and viscosities may be obtained by selecting different polyalkylene ether glycols, for example, polyethylene ether glycol, polypropylene ether glycol or polybutylene ether glycol and/or controlling the time of polymerization of a given polyalkylene ether glycol.

Toluene diisocyanates are obtained as mixtures of the 2,4- and 2,6-isomers, and as 100% 2,4-toluene diisocyanate. Both forms may be utilized in this invention but 2,4-toluene diisocyanate is preferred.

The preferred urethane prepolymers are the reaction products of 2,4-toluene diisocyanate and polybutylene ether glycol [poly(1,4-oxybutylene)glycol]. The polybutylene ether glycol is reacted with the 2,4-toluene diisocyanate in such a molar ratio as to obtain a final product having an excess of isocyanate groups and called a prepolymer. Prepolymer isocyanate contents from about 4–10% are commercially available. However it is prepolymers having an isocyanate content in excess of about 9% by weight when used in the composition of this invention that affected the strongest bond. Therefore, polyurethane prepolymers of the 2,4-toluene diisocyanate-polybutylene ether glycol type having an isocyanate content in excess of 9% are the preferred polyurethane embodiment of this invention.

Epoxy compounds which are useful are low molecular weight liquid diepoxides of the diglycidyl ether type. The glycidyl ether group

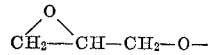

normally is formed reacting epichlorohydrin with the epoxide group or phenol in the presence of sodium hydroxide. For purposes of the adhesive formulation of this invention the liquid reaction products of epichlorohydrin and bisphenol-A (and its homologs) are preferred. Two particularly effective relatively low molecular weight liquid epoxies of this type are Epon 826 and 828. The difference between these two liquid resins is primarily in the spread of the molecular weight ranges. Only the relatively low molecular weight (e.g. 300–500 m.w.) liquid diepoxides are preferred in formulations of this invention where a long room temperature shelf life, but a rapid cure at elevated temperatures, is required. The rapid cure is affected by reaction of the isocyanate groups and epoxy groups with an amine and the specified suitable Lewis acid-amine catalyst.

The specific curing components used in this invention provide a strong adhesive bond which is rapidly obtained upon heating the formulation to a suitable elevated temperature. These components include both a suitable solid primary diamine as well as Lewis acid-amine complex such as $Al_3Cl$-aniline. These materials cooperate so as to allow sufficient time for preparation of the adhesive formulation and subsequent application thereof onto the surface of members to be joined before gelling to an unmanageable state. This is true even though a latent amine particle is not employed. With respect to the amines, the employment of solid aliphatic or aromatic diamines is preferred. Liquid aliphatic diamines such as diethylene triamine react so rapidly with a polyurethane and the epoxy resin that the adhesive gels before the curing agent can be thoroughly blended. Bicyclic aromatic primary diamines such as 1,5-naphthlene diamine and orthotolidine have been found to be effective curing agents. In addition, other solid diamines such as 2,4,5,6-tetrachloro-m-xylene-$\alpha,\alpha'$-diamine, 2,4-toluene diamine, p,p'-methylene dianiline, 2,6-diamino pyridine, orthophenylene diamine, meta-phenylene diamine and p-phenylene diamine have all proven to be useful.

In the curing of the urethane and epoxy compounds the use of approximately stoichiometric quantities of a diamine usually produces the highest bond strength. Such quantities are calculated assuming that the primary diamine will react with two isocyanate groups (bifunctional) or with four epoxy groups (tetrafunctional). It is not known whether the reaction proceeds precisely in this manner but the assumption provides a convenient and effective means for calculation. It is apparent, however, that the primary amine reacts with both the isocyanate groups and the epoxy groups because adhesive strength is much lower if the epoxy ingredient is omitted.

An adhesive formulation containing suitable portions of polyurethane prepolymer, bisphenol-A derived epoxy resin, and a solid primary diamine is capable of being cured as indicated to produce a strong bond. However, when it is desired to obtain an improved room temperature shelf life and markedly increased cure rate at an elevated temperature, my adhesive formulation is prepared to contain a small amount, up to about 10% by weight of the urethane-epoxy-diamine components, of a suitable Lewis acid-amine complex. As is well known, a Lewis acid is characterized as a substance which is capable of filling the valence shell of one of its atoms with an unshared pair of electrons from another atom or molecule. In accoradnce with the subject invention, the Lewis acid apparently receives the unshared pair of electrons from an organic amine to form the complex which markedly improves the rate of cure.

In general, the Lewis acid-type materials which are suitable for use in the subject formation are the anhydrous halide salts of elements such as, for example, boron, aluminum, silicon, tin, antimony and titanium. It is preferred that the nonhalide component of the Lewis acid be in its highest normal oxidation state. For example, specific Lewis acids which are suitable for use herein are silicon tetrachloride, aluminum trichloride, aluminum tribromide, boron trifluoride, antimony pentachloride, titanium tetrachloride and tin tetrachloride. These acids are combined, in a manner which will be described, with an amine such as aniline, m-phenetidine, m-anisidine, 2,4-dichloroaniline, menthane diamine, diethylenetriamine and N,N'-dimethyl-p-toluidine to form the addition complex which provides a catalytic curing effect in my formulation. In general, these complexes may be prepared by dissolving the amine component in a suitable solvent such as benzene. The Lewis acid in anhydrous form is added under anhydrous conditions to the amine solution. Almost immediately a precipitate is formed which is believed to be an addition complex of the Lewis acid and the amine. I have found that if the precipitate formed as described is filtered from the solution, dried and comminuted to a powder form, it provides a catalytic effect on the curing rate of the above-described epoxy urethane resins.

I have tested many of the known organic amines, including those listed above, in the Lewis acid-amine complex catalyst and have found none which would not increase the rate of hardening and cure of the adhesive formulation. Based on these experiments there is every indication that virtually any amine would be useful in this environment. However, many of these amines are expensive and toxic. Some are carcinogenic. Because of its low cost and relatively low toxicity, I prefer to employ aniline in combination with a Lewis acid to form the catalyst component of the formulation. With respect to the Lewis acids I prefer the use of aluminum trichloride, aluminum tribromide, titanium tetrachloride or silicon tetrachloride as they are more readily available and convenient to employ in the preparation of the complex.

Thus, the novel composition of my adhesive preferably includes approximately 100 parts by weight of a liquid polyurethane prepolymer derived from toluene diisocyanate and polybutylene ether glycol; 10–40 parts by weight of a liquid diepoxide derived from bisphenol-A and epichlorohydrin; 8–50 parts by weight of a solid aliphatic or aromatic primary diamine, preferably in the latent form wherein the surface amino groups have been converted to substances which are nonreactive with the epoxy and urethane resins; and a small amount up to about 10% of the total weight of the other three components (about 20 parts) of a Lewis acid-amine complex. Preferably the Lewis acid is taken from the group consisting of $AlCl_3$, $AlBr_3$, $SiCl_4$ and $TiCl_4$. The polyurethane prepolymer is characterized by an isocyanate content from about 4–10%. When the diamine curing agent is employed in latent form the composition may be prepared as a one-part formulation which may be allowed to stand for up to five months at room temperature without gelling to a viscosity in which it is unmanageable for use. Even after standing for such a prolonged period, however, the same composition may be applied to members to be joined and the members juxtaposed and heated to temperature of about 250° F. or higher to harden in about one minute and substantially fully cure in about five minutes. The following specific examples of preferred embodiments of the subject invention clearly illustrate the use of the Lewis acid-amine catalyst in combination with the above three-component adhesive to produce rapidly cured, strong adhesive bonds.

EXAMPLE 1

A relatively large batch of an adhesive formulation was prepared for use in this and the following examples. The formulation contained 100 parts of a liquid polyurethane prepolymer formed by the reaction between toluene diisocyanate and polybutylene ether glycol (Adiprene LD 213); 35 parts of a liquid epoxy resin formed by the reaction between bisphenol-A and epichlorohydrin (Epon 826) and 47 parts tetrachloro-m-xylene diamine. The polyurethane prepolymer was characterized by an isocyanate content of from about 9.2–9.5% by weight and a viscosity at 86° F. of from about 12,000 to 18,000 cps. The solid diamine curing agent in powder form had previously been rendered latent by treatment of the surface thereof with sebacyl chloride in accordance with the method described and claimed in said U.S. Pat. No. 3,375,299 and subsequently sieved through a 200 mesh screen. The polyurethane prepolymers and epoxy resin were each degassed in vacuum prior to formulation. The ingredients were combined by a simple mixing operation.

Into 182 parts of the formulation was thoroughly mixed 3.4 parts of $AlCl_3$-aniline complex in powder form which had been prepared as described above. A portion of this catalyst containing formulation was applied to a portion of a surface of a number of steel strips 0.068" thick. The strips were paired with their coated surfaces in juxtaposition. The strips were heated to a temperature of 250° F. for five minutes to obtain a substantially complete cure. After cooling to room temperature the strips were subjected to lap shear strength tests in accordance with ASTM D–1002 as stated above. The average lap shear strength was observed to be about 4,030 p.s.i.

A portion of the formulation containing none of the Lewis acid-amine complex was also applied to surfaces of steel strips (0.068" thick), the strips were paired together and heated to 250° F. for about twelve minutes to fully cure the resins. The strips were subjected to tests as above in accordance with the ASTM procedure and the lap shear strength was observed to be about 4,000 p.s.i. It is noted that a substantially longer heating period was required to cure adhesive formulation which did not contain the catalyst.

EXAMPLE 2

Approximately 3.4 parts of an aluminum trichloride-aniline complex in powdered form was uniformly incorporated into 182 parts of the basic adhesive formulation prepared as in Example 1. A portion of this catalyst containing formulation was allowed to stand for one week and then applied to a surface of a number of steel strips which were 0.068" in thickness. The coated portions of the surfaces were paired in juxtaposition and heated at 250° F. for five minutes. After cooling to room temperature the bonded pairs of strips were subjected to lap shear strength determinations in accordance with ASTM D–1002. The average strength of the adhesive bonds was found to be about 4040 p.s.i.

A second portion of this catalyst containing formulation was allowed to stand for five and a half months before being tested. At the end of this period it was applied to portions of the surface of a number of steel strips, each 0.068" in thickness. The adhesive was cured by heating at 250° F. for five minutes and tested as above. The average strength of the bonds was found to be about 3920 p.s.i. It is seen that even after standing for over five months my catalyst containing adhesive formulation may still be applied to members to be joined and rapidly cured to form a strong adhesive bond.

EXAMPLE 3

A portion of the basic adhesive formulation prepared as in Example 1 containing the latent curing agent was allowed to stand for one week before application to a surface portion of a number of steel strips (0.068" thick). Again it was found that about fifteen minutes was required to obtain a suitable cure with this formulation. The average lap shear strength of specimens prepared with the week-old adhesive formulation was found to be about 2500 p.s.i. It was noted that with respect to formulations of this type, containing relatively slow curing epoxy resins, an approximately 40% loss in bond strength is suffered after standing for one week unless the catalyst is employed.

Another portion of the basic adhesive formulation prepared as in Example 1 was allowed to stand for five and a half months. At the end of this time the material had gelled to the point at which it could not be applied to the surfaces of the steel strips and no suitable tests could be conducted with this material.

EXAMPLE 4

Into approximately 182 parts of the basic formulation from Example 1 was uniformly incorporated about 3.4 parts of aluminum tribromide-aniline complex. This formulation was allowed to stand for five weeks and then some of the adhesive was applied to a surface of several steel strips 0.057" in thickness. The steel strips were paired, juxtaposed and heated at 250° F. for five minutes. After cooling the bonded assembly was subjected to lap shear strength determination as above and was found that an average loading of 3650 p.s.i. was required to cause bond failure.

Another portion of the aluminum tribromide-aniline complex containing adhesive formulation was allowed to stand for eight weeks before application to steel strips 0.057" in thickness. Again the adhesive was cured by heating at 250° F. for five minutes and the bonded assemblies cooled to room temperature. An average lap shear strength of 3600 p.s.i. was found.

EXAMPLE 5

A portion of the basic formulation was prepared as in Example 1 and allowed to stand for five weeks without incorporating any catalyst therein. Some of this material was applied to surfaces of steel strips 0.057″ in thickness. It was found that a minimum of fifteen minutes at 250° F. was required to cure the adhesive. An average lap shear strength of 3000 p.s.i. was observed with these specimens.

EXAMPLE 6

Into approximately 182 parts of the basic adhesive formulation of Example 1 was uniformly incorporated approximately 3.4 parts of aluminum trichloride-dichloroaniline complex in powder form. After standing overnight some of this catalyst containing adhesive was applied to the surfaces of steel strips 0.057″ in thickness. Pairs of the strips were juxtaposed and heated at 250° F. for five minutes. Average lap shear strength values of 3430 p.s.i. were measured.

EXAMPLE 7

Into approximately 182 parts of the basic adhesive formulation prepared as in Example 1 was incorporated about 3.4 parts of silicon tetrachloride-aniline complex in powder form. After standing overnight some of this adhesive was applied to surfaces of steel strips 0.057″ in thickness. Pairs of strips were juxtaposed and heated at 250° F. for five minutes. After cooling to room temperatures they were subjected to standard tests. Average lap shear strength values of 3100 p.s.i. were measured.

It is thus seen that the Lewis acid-amine catalyst containing adhesive formulations maintain their rapid cure properties and high strength properties when cured even after standing for extended periods of time. These properties are of great advantage in production operations in which it is convenient to prepare a batch of adhesive and employ portions of this batch several days or weeks without having to clean the mixing or application equipment.

In general, it is preferred to have a one-part adhesive formulation of prolonged room temperature shelf life. For this reason the examples set forth above have all employed a diamine curing agent in latent form. It will be appreciated, however, that untreated solid diamine curing agents may be employed in combination with my catalyst and resin formulation in a multi-part formulation to still obtain the benefits of the relatively rapid cure of the overall adhesive composition.

It is known that Lewis acid-amine type catalysts will cure epoxy resins to form a strong adhesive bond. However, the rate of cure is much slower than is obtained with the formulations described herein. It might then be expected that the catalyst alone would cure the subject urethane epoxy mixtures. However, I have observed that such is not the case. The adhesives will not cure in the absence of the diamine curing agent even after prolonged heating at 250° F. or higher.

Preferably, the diamine curing agent is present in a latent form, e.g. wherein the amine groups in or near the surface of the particle have been converted to substances which are nonreactive or only slowly reactive, with the resin system employed in this invention at room temperature. One such method of preparing latent particulate diamine involves the reaction of the amine with a suitable acid chloride as described above. In another suitable method of preparing a latent diamine the solid amine is reacted with an aqueous solution of formaldehyde to form a surface layer which is inert with respect to the polyurethane and epoxy resins at room temperature. This process is described in detail in U.S. Pat. No. 3,426,097, patented Feb. 4, 1969. The formaldehyde-treated diamine particle while substantially inert at room temperature is operable to cure the resin system when heated to a suitable elevated temperature.

In addition to the above two techniques for preparing latent solid diamine curing agents I am aware that such curing agents may also be prepared by treating the surface only of the solid diamine with toluene diisocyanate. Thus, it is appreciated that the solid latent curing agent may be prepared in a number of ways, and curing agents of this type are intended to be employed in accordance with the subject invention when a one-part adhesive formulation having an extended shelf life at room temperature is desired.

While my invention has been described in terms of a few specific embodiments thereof, it will be appreciated that other forms might readily be adopted by those skilled in the art and therefore the scope of the invention is intended to be limited only by the following claim.

I claim:
1. A one-part adhesive formulation comprising by weight about 100 parts of a liquid polyurethane prepolymer, formed by the reaction between toluene diisocyanate and a polyether glycol, said prepolymer being characterized by an isocyanate content of from about 4% to about 10%; 10 to 40 parts of a low molecular weight liquid polymeric reaction product of bisphenol-A and epichlorohydrin, said reaction product having at least about two epoxy groups per molecule; 8 to 50 parts of a particulate solid primary diamine and a small but effective amount up to about 20 parts of a Lewis acid-amine complex synergistic catalyst taken from the group consisting of aluminum trichloride-aniline, aluminum tribromide-aniline, silicon tetrachloride-aniline, and titanium tetrachloride-aniline, the amine groups in or near the surface of said diamine particles having been chemically converted to substances which are not reactive with said polyurethane prepolymer and said epoxide at room temperature, by the reaction of said diamine particles with an ethylenically saturated carboxylic acid chloride, said adhesive formulation being substantially unreactive at normal room temperature for extended periods, but being rapidly curable to a strong adhesive bond upon being heated at a suitable elevated temperature.

References Cited
UNITED STATES PATENTS

| | | | |
|---|---|---|---|
| 2,090,494 | 10/1959 | Parry | 260—47 |
| 3,042,545 | 7/1962 | Kiemle | 260—830 |
| 3,148,167 | 9/1964 | Keplinger | 260—830 |
| 3,158,586 | 11/1964 | Krause | 260—830 |
| 3,282,896 | 11/1966 | Einberg | 260—830 |
| 3,290,208 | 12/1966 | Lewis | 260—830 |
| 3,338,873 | 8/1967 | Gurgiolo | 260—830 |
| 3,380,950 | 4/1968 | Blomeyer | 260—830 |
| 3,375,299 | 3/1968 | Levine | 260—830 |
| 3,426,097 | 2/1969 | Ilka | 260—830 |
| 3,510,439 | 5/1970 | Kaltenbach | 260—830 |

PAUL LIEBERMAN, Primary Examiner

U.S. Cl. X.R.

260—47, 77.5; 117—132